Dec. 16, 1941. W. W. DURANT ET AL 2,266,392

COATING APPARATUS

Filed March 26, 1940

INVENTORS
WALTER W. DURANT,
ROBERT B. BARNES,
By Ellis S. Middleton
ATTORNEY.

Patented Dec. 16, 1941

2,266,392

UNITED STATES PATENT OFFICE 2,266,392

COATING APPARATUS

Walter W. Durant, Old Greenwich, and Robert B. Barnes, Stamford, Conn., assignors to American Cyanamid Company, New York, N. Y., a corporation of Maine Application March 26, 1940, Serial No. 325,964

4 Claims. (Cl. 34—60)

This invention relates to an apparatus for the production of coatings having a high degree of hardness, toughness and flexibility, such as those produced by the use of varnish or enamels. More particularly, it relates to an apparatus for the production on electrical wire of varnish or enamel films having the desirable properties mentioned.

In the past, the enameling of wire with coating materials composed of combinations of drying oil or drying oil acids and natural or synthetic resins, has been carried out at high temperatures, i. e., from about 300°–500° C., in order to bake the enamel and produce dry films in a minimum space of time. These high temperatures have a harmful effect on the film obtained, sometimes resulting in complete decomposition of the varnish and consequent destruction of the film.

Furthermore, experiments have shown that enamel films of maximum toughness and hardness are obtained when the baking is effected at low temperatures for a long time, for example, about 48 hours at about 100° C. It is obvious that such a long period of baking is impractical and any process requiring it becomes commercially unattractive; since production is thereby limited.

An improved method of producing varnish or enamel films which have sufficient hardness, toughness and flexibility to be suitable as electrical wire coatings is described in the copending application of Robert B. Barnes, Serial No. 318,385, filed February 10, 1940. According to this process, films of varnishes or enamels are subjected simultaneously to ultra-violet radiation and to heat, preferably below about 300° C. but sufficiently high to evaporate any volatile solvents present in the varnish or enamel, all for a short period of time. The dry film thus produced is baked at a relatively low temperature, e. g., 85–110° C., until optimum properties are obtained. The low temperature baking period is relatively long, as compared with the initial heating period in the presence of ultra-violet radiation, but is considerably shorter than required in prior art processes. Low temperature baking for about 24 hours will give coatings having as high a degree of hardness and toughness as were obtained by 48 hours' baking according to prior processes.

The present invention contemplates an apparatus for carrying out the first step of the above process, namely, the heating of the enamel coating in the presence of ultra-violet radiation to produce a dry, tack-free film, and will be described in detail in conjunction with the drawing, in which—

Figure 1:
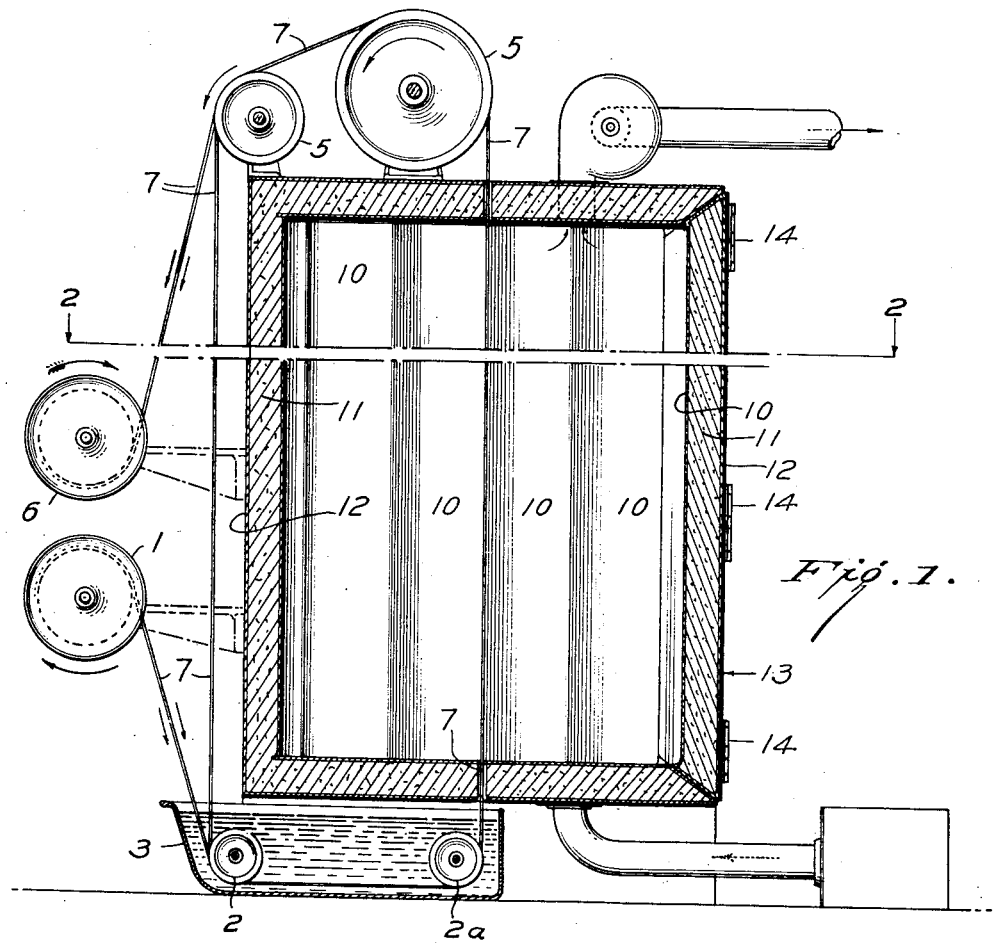
Fig. 1 is a side elevation partly in section of a wire enameling apparatus.

Referring to Fig. 1, wire to be coated passes from supply spool 1 to sheaves 2 and 2a through the enamel-containing dip tank 3 where it receives a film of enamel or other equivalent coating composition. It is then conveyed through oven 4, which may be equipped with a blower or fan for circulating air or with any other suitable means of removing volatilized solvent therefrom, over sheave 5 from whence it may either return to sheaves 2 and 2a for additional coats or pass on to collector spool 6 where the finished coated wire is stored. The arrows indicate the direction of travel of the wire during treatment. It is preferable that spool 6 be power driven.

Figure 2:
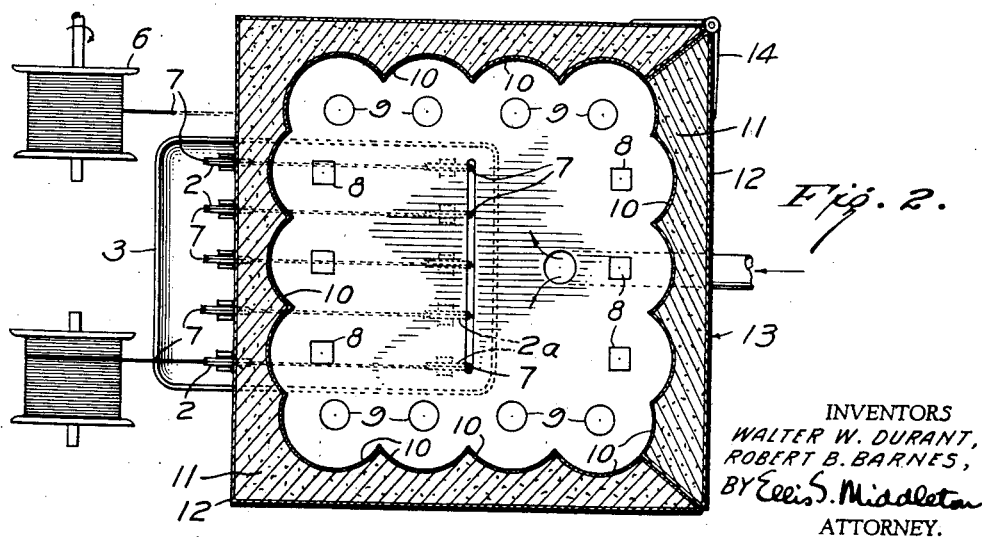
Fig. 2 is a sectional view along the line 2—2 of Fig. 1.

When the film-bearing wire 7 (Fig. 2) enters the heating chamber or oven 4, it is subjected to the simultaneous action of heat supplied by globar resistance element 8, and ultra-violet radiation arising from a Cooper-Hewitt high pressure mercury arc 9. An aluminum reflector 10 distributes radiation substantially uniformly over the interior of the oven, while the space 11 between reflector 10 and oven wall 12, whether packed or not, is for purposes of heat insulation.

The ultra-violet source or sources may be serviced through door 13 mounted on hinge 14.

Instead of dip tank 3, any other suitable means for applying the coating may be used. For instance, the coating may be sprayed, flowed or brushed onto the wire.

In place of the globar resistance element 8, a nichrome or other electrical resistance element may be used without departing from the spirit and scope of the invention.

Similarly, any suitable source of ultra-violet radiation may be substituted for the Cooper-Hewitt high pressure mercury arc, and the reflector for the ultra-violet radiation may be of any suitable material.

The baking temperature in oven 4 is preferably above about 150° C. and below about 300° C. It is, however, selected according to the volatile solvent which is used in the varnish. A temperature is selected which will volatilize the solvent relatively rapidly and which at the same time will leave a uniform and substantially bubble-free film.

The following example is given by way of illustration:

The following substances were compounded into a wire-coating composition:

| | Parts |
|---|---|
| Phthalic anhydride | 148 |
| Glycerol | 100 |
| Linseed oil fatty acids | 80 |
| Tung oil | 317 |
| Ester gum | 125 |
| Resin A | 150 |

Resin A may be a fatty, oil-soluble resin, such as a phenol formaldehyde condensate modified with rosin and if desirable, partially or completely esterified with glycerol or other alcohol. Otherwise it may be an oil-soluble phenol aldehyde resin obtainable by reacting formaldehyde with an alkyl or an aryl substituted phenol. The phthalic anhydride, glycerol and linseed oil fatty acids are reacted together in the well-known manner until a relatively low acid number oleate resin is obtained. The resin is then mixed with the tung oil and to this the ester gum and resin A are added, the whole being heated sufficiently to form a homogeneous solution. 40 parts of this resin are dissolved in a solvent mixture containing, for example, ten parts of furfural, 5 parts of dibutyl phthalate and 45 parts of coal tar naphtha (boiling point 163° to 177° C. and a flash point of 116° C.). This composition was applied to copper wire .0113 inch in diameter by passing the same through a bath of the solution. The coated wire was then dried by passing it through the apparatus above described where the infra-red lamps were from 6 inches to 2 feet from the wire and in the presence of ultra-violet light radiation. In the above case, a drying tower 12 to 18 feet high was desirable. The linear speed of wire passing through the tower was from 12 to 15 feet a minute. By passing the wire from four to eight times through the bath with drying following each application, a thickness of .9 mil was obtained on the wire. Using this procedure, the time of each baking was from thirty seconds to one minute. The relative hardness after this baking operation was from 60 to 100. Following this preliminary bake, a lower temperature bake of about 100° C. was obtained by exposing the wire to this heat in the above apparatus for from 16 or 24 hours, after which time the relative hardness was about 250 to 350, while the flexibility of the film produced was excellent.

It will be apparent that an important advantage of the present invention lies in the fact that the heating means and sources of ultra-violet radiation are uniformly distributed so that all sides of the wire are exposed to both heat and ultra-violet radiation.

The enamel films produced in the apparatus of this invention are much tougher and harder than films produced at the same temperature in a conventional enameling oven.

Similarly, metal or other strips may be likewise coated in the apparatus of this invention.

While the invention has been shown and described with particular reference to specific embodiments, it is to be understood that it is not to be limited thereto but is to be construed broadly and restricted solely by the scope of the appended claims.

We claim:

1. In an apparatus for enamelling wire, a baking chamber, means for passing a plurality of runs of the same coated wire therethrough, a series of sources of ultraviolet radiation on two sides of the chamber, a series of sources of infrared radiation on the opposite two sides of the chamber, the wire in its passage through the chamber progressing in a plane substantially midway between and parallel to the planes of the sources of infrared radiation, and in a plane substantially at right angles to the planes of the sources of ultraviolet radiation, whereby all parts of the wire are bathed with both ultraviolet and infrared radiations during its transit through the chamber, the wire passing first through a progressively decreasing concentration of ultraviolet radiation and then through a progressively increasing concentration of ultraviolet radiation.

2. In an apparatus for enamelling wire, a baking chamber, means for passing a plurality of runs of the same coated wire therethrough, a series of sources of ultraviolet radiation on two sides of the chamber, a series of sources of heat radiation on the opposite two sides of the chamber, the wire in its passage through the chamber progressing in a plane substantially midway between and parallel to the planes of the sources of heat radiation, and in a plane substantially at right angles to the planes of the sources of ultraviolet radiation, whereby all parts of the wire are bathed with both ultraviolet and heat radiations during its transit through the chamber, the wire passing first through a progressively decreasing concentration of ultraviolet radiation and then through a progressively increasing concentration of ultraviolet radiation.

3. In an apparatus for enamelling wire, a baking chamber, means for passing a plurality of runs of the same coated wire therethrough, a series of sources of ultraviolet radiation on two sides of the chamber, a series of sources of heat radiation on the opposite two sides of the chamber, the wire in its passage through the chamber progressing in a plane substantially midway between and parallel to the planes of the sources of one type radiation and in a plane substantially at right angles to the planes of the sources of the other type radiation, whereby all parts of the wire are bathed with both ultraviolet and heat radiation during its transit through the chamber, the wire passing first through a progressively decreasing concentration and then through a pregressively increasing concentration of one type radiation.

4. In an apparatus for enamelling wire, a baking chamber, means for passing a plurality of runs of the same coated wire therethrough, a series of sources of ultraviolet radiation on two sides of the chamber, a series of sources of infrared radiation on the opposite two sides of the chamber, the wire in its passage through the chamber progressing in a plane substantially midway between and parallel to the planes of the sources of one type radiation and in a plane substantially at right angles to the planes of the sources of the other type radiation, whereby all parts of the wire are bathed with both ultraviolet and infrared radiation during its transit through the chamber, the wire passing first through a progressively decreasing concentration and then through a progressively increasing concentration of one type radiation.

WALTER W. DURANT.
ROBERT B. BARNES.